UNITED STATES PATENT OFFICE.

ERWIN E. A. G. MEYER, OF DETROIT, MICHIGAN, ASSIGNOR TO MORGAN & WRIGHT, A CORPORATION OF MICHIGAN.

PROCESS FOR VULCANIZING RUBBER.

1,350,824.

Specification of Letters Patent.  Patented Aug. 24, 1920.

No Drawing.  Application filed April 29, 1916.  Serial No. 94,387.

*To all whom it may concern:*

Be it known that I, ERWIN E. A. G. MEYER, a citizen of the United States, residing at Detroit, county of Wayne, and State of Michigan, have invented certain new and useful Improvements in Processes for Vulcanizing Rubber, of which the following is a full, clear, and exact description.

This invention relates to processes for vulcanizing rubber and is more particularly directed to a vulcanizing process employing an accelerator.

The objects of my invention are to hasten the speed and lessen the heat and pressure, where heat and pressure are employed, in the vulcanizing process, and at the same time to lower the cost of the ingredients employed. The invention also aims to improve the quality of the resultant product.

In carrying out the process in its preferred form I add to one hundred parts of rubber stock or compound, at any suitable point during the mixing operation for incorporation of sulfur and other materials, one to two parts of a solution of caustic soda (approximately one part of caustic soda to two parts of water) and the solution is thoroughly incorporated in the mass. The mass containing sulfur and the solution of caustic soda is then vulcanized under heat and pressure.

It has been found in the employment of caustic soda as an accelerator, in the manner above set forth, that a saving in time is effected over that usually required when such substances as litharge and antimony sulfid are employed, which may vary from thirty to seventy per cent. if the ordinary temperature and pressure be employed, or a similar saving in heat and pressure may be effected if the ordinary time is allowed. The process is preferably carried out so that a saving in each of these factors is secured. It has further been found that the products resulting from this treatment are distinguished from the products obtained by the use of litharge, etc., by their greater toughness and generally improved physical qualities.

By my improved method I completely solve the problem heretofore existing in the use of accelerators of the nature of alkali hydroxid, and furthermore render unnecessary the difficult operation of grinding the alkali, and I also avoid the tendency of the ground alkali to agglomerate, a tendency due to its hydroscopic nature.

Having thus described my invention what I claim as new and desire to protect by Letters Patent is:

1. In the process of vulcanization, the addition of a small quantity of a concentrated solution of a caustic alkali.

2. In a method of accelerating the vulcanization of rubber which consists in combining with the rubber a vulcanizing agent and an alkali hydroxid in a solvent.

3. In the manufacture of rubber goods the steps which comprise milling rubber in a plastic state with a solution of alkali hydroxid in insufficient amount to appreciably change the plasticity of the rubber and finally subjecting the mixture to a heat vulcanizing process.

4. In the manufacture of rubber goods the method of accelerating the vulcanization of rubber which consists in milling rubber in a plastic state with a water solution of alkali hydroxid, and finally subjecting the mixture to heat.

5. A method for accelerating the vulcanization of rubber goods which comprises the step of milling with 100 parts of rubber stock one to two parts of water solution of caustic soda.

Signed at Detroit, Mich., this 24th day of April 1916.

ERWIN E. A. G. MEYER.